UNITED STATES PATENT OFFICE.

M. L. IVERS, OF ONECO, AND GEORGE L. COOLEY, OF PLAINFIELD, CONN.

IMPROVED COMPOUND FOR CLEANING STONE, &c.

Specification forming part of Letters Patent No. 90,754, dated June 1, 1869.

*To all whom it may concern:*

Be it known that we, M. L. IVERS, of Oneco, and GEORGE L. COOLEY, of Plainfield, in the county of Windham, and State of Connecticut, have invented a new and Improved Composition for Cleaning Granite, Freestone, and Marble; and we do hereby declare that the following is a full, clear, and exact description thereof, which will enable others skilled in the art to make and use the same.

This invention relates to a new composition for cleaning the surfaces of granite, freestone, marble, and all other kinds of stone employed in buildings, graveyards, monuments, and for other purposes, to free them from vegetable impurities, and to remove all blemishes, without injury to the stone or marble on which the composition is used.

The preparation is composed of the following ingredients, in about the proportions set forth: One hundred and twenty-eight parts of muriatic acid; two parts of powdered chalk; four parts of pulverized pumice-stone; two parts of sal-soda; two parts oxalic acid; eight parts common salt; one-half part chloride of lime; sixteen parts alcohol; one part sweet-oil.

These ingredients are mixed together in a suitable vessel, and the mixture is applied by to the stone by means of a brush or otherwise, and then the stone is washed with water.

For cleaning marble the above composition should be diluted by adding one-third its quantity of water. This composition will be very useful, especially for cleansing and renovating buildings. It will do its work very effectually, and is moreover cheap and readily produced.

The salt, chloride of lime, and sweet-oil may be omitted, and water may, if desired, be used in the mixture for all purposes.

Having thus described our invention, we claim as new and desire to secure by Letters Patent—

The composition herein set forth for cleaning stone.

M. L. IVERS.
G. L. COOLEY.

Witnesses:
CHAS. C. WILLIAMS,
JOHN WINDSOR.